US008801303B2

(12) United States Patent  (10) Patent No.: US 8,801,303 B2
Ueda  (45) Date of Patent: Aug. 12, 2014

(54) CASE STRUCTURE AND IMAGING DEVICE

(75) Inventor: Takeshi Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 271 days.

(21) Appl. No.: 13/537,052

(22) Filed: Jun. 29, 2012

(65) Prior Publication Data
US 2013/0002945 A1 Jan. 3, 2013

(30) Foreign Application Priority Data

Jul. 1, 2011 (JP) ................................. 2011-147694

(51) Int. Cl.
G03B 17/00 (2006.01)
H04N 5/225 (2006.01)
G03B 17/56 (2006.01)
G03B 17/02 (2006.01)

(52) U.S. Cl.
CPC .......... *G03B 17/02* (2013.01); *G03B 2217/002* (2013.01); *H04N 5/2252* (2013.01); *G03B 17/566* (2013.01); *Y10S 224/908* (2013.01)
USPC ........... 396/423; 348/373; 348/374; 348/375; 396/419; 396/424; 224/908

(58) Field of Classification Search
USPC ........... 348/373–376; 396/419–428; 224/267, 224/908
See application file for complete search history.

(56) References Cited

U.S. PATENT DOCUMENTS

| 4,152,065 | A | * | 5/1979 | Kobori ........................... 396/535 |
| 4,320,863 | A | * | 3/1982 | Lyer et al. ...................... 224/259 |
| 4,348,095 | A | * | 9/1982 | Suzuki et al. .................. 396/539 |
| 4,637,535 | A | * | 1/1987 | Aleman ......................... 224/620 |
| 5,115,264 | A | * | 5/1992 | Schappler ..................... 396/423 |
| 5,348,206 | A | * | 9/1994 | Scherer ......................... 224/220 |
| 5,568,217 | A | * | 10/1996 | Arai et al. ..................... 396/536 |
| 5,680,977 | A | * | 10/1997 | Burke ............................ 224/576 |
| 5,708,897 | A | * | 1/1998 | Manabe et al. ............... 396/535 |
| 5,725,136 | A | * | 3/1998 | Shires ........................... 224/257 |
| 5,815,758 | A | * | 9/1998 | Terada .......................... 396/535 |
| 6,064,823 | A | * | 5/2000 | Solomon ......................... 396/6 |
| 6,115,559 | A | * | 9/2000 | Balling et al. ................ 396/541 |
| 6,134,388 | A | * | 10/2000 | Balling et al. ................... 396/6 |
| 6,217,095 | B1 | * | 4/2001 | Yamada ......................... 294/149 |
| 6,264,379 | B1 | * | 7/2001 | Rydelek et al. .............. 396/423 |

(Continued)

FOREIGN PATENT DOCUMENTS

JP  H4-130475 U  11/1992
JP  H7-225423 A  8/1995

(Continued)

*Primary Examiner* — Michael Osinski
(74) *Attorney, Agent, or Firm* — Shinjyu Global IP

(57) ABSTRACT

Herein describes, by example, a case structure that includes a first cover, a second cover and a first side frame. The second cover opposes the first cover. An internal space is formed between the first cover and the second cover. The first side frame is arranged between the first cover and the second cover. The first side frame has a reinforcing part and a strap holder part. The reinforcing part is arranged along each of a first side end part of the first cover and a second side end part of the second cover. The reinforcing part is connected to each of the first side end part and the second side end part. The strap holder part connects to an end part of the reinforcing part. The strap holder part is folded in an outward direction from the internal space.

7 Claims, 6 Drawing Sheets

(56) References Cited

U.S. PATENT DOCUMENTS

| | | | |
|---|---|---|---|
| 6,356,711 B1* | 3/2002 | Takagi et al. | 396/6 |
| 6,532,152 B1* | 3/2003 | White et al. | 361/692 |
| 6,721,014 B1* | 4/2004 | Ariga | 348/374 |
| 6,826,366 B2* | 11/2004 | Kaneko et al. | 396/388 |
| 7,360,956 B2* | 4/2008 | Yamamoto | 396/423 |
| 7,507,041 B2* | 3/2009 | Ueda et al. | 396/423 |
| 7,518,673 B2 | 4/2009 | Doui | |
| 7,525,596 B2* | 4/2009 | Yamaguchi | 348/375 |
| 7,936,557 B2* | 5/2011 | Kobayashi | 361/679.01 |
| 8,035,736 B2* | 10/2011 | Son | 348/376 |
| 8,199,492 B2* | 6/2012 | Liang et al. | 361/679.56 |
| 8,233,082 B2* | 7/2012 | Yamamoto | 348/375 |
| 2002/0015589 A1* | 2/2002 | Nakanishi et al. | 396/176 |
| 2002/0186978 A1* | 12/2002 | Tanaka et al. | 396/539 |
| 2004/0067054 A1* | 4/2004 | Ichikawa et al. | 396/448 |
| 2004/0071465 A1* | 4/2004 | Smart et al. | 396/435 |
| 2005/0057685 A1* | 3/2005 | Yamaguchi | 348/375 |
| 2005/0179813 A1* | 8/2005 | Fujii et al. | 348/375 |
| 2006/0024045 A1* | 2/2006 | Yamamoto | 396/423 |
| 2006/0165407 A1* | 7/2006 | Ueda et al. | 396/539 |
| 2006/0181639 A1* | 8/2006 | Ueda et al. | 348/376 |
| 2006/0192890 A1* | 8/2006 | Watanabe et al. | 348/373 |
| 2006/0290686 A1* | 12/2006 | Shimizu et al. | 345/179 |
| 2007/0046854 A1* | 3/2007 | Doui | 349/58 |
| 2007/0268393 A1* | 11/2007 | Hong et al. | 348/333.12 |
| 2007/0284373 A1* | 12/2007 | Okuchi | 220/262 |
| 2008/0182633 A1 | 7/2008 | Imaizumi et al. | |
| 2008/0219657 A1* | 9/2008 | Suzuki et al. | 396/423 |
| 2008/0292303 A1* | 11/2008 | Kope et al. | 396/423 |
| 2009/0003820 A1* | 1/2009 | Law et al. | 396/423 |
| 2009/0047009 A1* | 2/2009 | Nagano | 396/55 |
| 2010/0013986 A1* | 1/2010 | Yamamoto | 348/375 |
| 2010/0014227 A1* | 1/2010 | Kobayashi | 361/679.01 |
| 2010/0054724 A1* | 3/2010 | Chamberlayne | 396/423 |
| 2010/0188516 A1* | 7/2010 | Kaneko et al. | 348/208.4 |
| 2012/0168336 A1* | 7/2012 | Schmidt et al. | 206/478 |

FOREIGN PATENT DOCUMENTS

| | | |
|---|---|---|
| JP | 2007-033510 A | 2/2007 |
| JP | 2007-067542 A | 3/2007 |
| JP | 2007-116299 A | 5/2007 |
| JP | 2008-187121 A | 8/2008 |

* cited by examiner

CASE STRUCTURE AND IMAGING DEVICE

CROSS-REFERENCE TO RELATED APPLICATIONS

This application claims priority under 35 U.S.C. §119 to Japanese Patent Application No. 2011-147694, filed on Jul. 1, 2011. The entire disclosure of Japanese Patent Application No. 2011-147694 is hereby incorporated herein by reference.

BACKGROUND

1. Technical Field

The present invention relates to a case structure having a strap holder, and an imaging device provided with the case structure.

2. Background Information

Conventionally, many cameras comprise a strap holder for attaching a strap. For example, the strap holder described in Japanese Laid-Open Patent Application H07-225423 has a protrusion protruding from a side surface of the camera, and a support part that is inserted into the camera interior. The protrusion has a strap hole, through which a strap is passed. The support part has a screw hole, through which a screw is passed; and a boss hole, into which a positioning boss is inserted. The support part is secured to the camera interior by a screw.

SUMMARY

However, the strap holder described in Japanese Laid-Open Patent Application H07-225423 is formed in a flat plate shape, and the width of the strap holder itself is large; therefore, the following problem is presented. The interior space in the camera is reduced when using the structure for securing the support part provided in the camera interior as described in Japanese Laid-Open Patent Application H07-225423. If the structure for securing the support part is provided on the outside surface of the camera, the lateral width of the camera itself will increase.

In view of the situation described above, an object of the present invention is to provide a case structure and an imaging device which reduces the width of a strap holder.

A case structure is provided that includes a first cover, a second cover and a first side frame. The second cover opposes the first cover. An internal space is formed between the first cover and the second cover. The first side frame is arranged between the first cover and the second cover. The first side frame has a reinforcing part and a strap holder part. The reinforcing part is arranged along each of a first side end part of the first cover and a second side end part of the second cover. The reinforcing part is connected to each of the first side end part and the second side end part. The strap holder part connects to an end part of the reinforcing part. The strap holder part is folded in an outward direction from the internal space.

According to the present invention, it is possible to provide a case structure and an imaging device in which the width of a strap holder can be reduced.

These and other objects, features, aspects and advantages of the present invention will become apparent to those skilled in the art from the following detailed description, which, taken in conjunction with the annexed drawings, discloses a portion of possible embodiments of the present invention.

BRIEF DESCRIPTION OF DRAWINGS

Referring now to the attached drawings which form a part of this original disclosure.

DETAILED DESCRIPTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Exemplary Embodiment

Herein is a description of an exemplary embodiment of the present invention with reference to the accompanying drawings. In the following description of the drawings, portions that are identical or similar are affixed with identical or similar numerals. However, the drawings are schematic, and the proportion of the dimensions and other details may differ from those in reality. Therefore, specific dimensions and other details should be understood with consideration of the following description. It shall be apparent that there are portions in which relationships or proportions between dimensions also differ between each of the drawings.

In the exemplary embodiment, a description will be given using a digital camera as an example of an imaging device. In the following description, a digital camera is described in a landscape orientation, the subject side is expressed as "front", the side opposite the subject is expressed as "rear," the vertically upward side is expressed as "up," the vertically downward side is expressed as "down," the right side facing the digital camera from the subject is expressed as "right," and the left side facing the digital camera from the subject is expressed as "left." A landscape orientation is an orientation of the digital camera in an instance in which the direction of the long sides of a rectangular image laid out on its side substantially matches the horizontal direction in the image.

Overall Configuration

Figure 1:
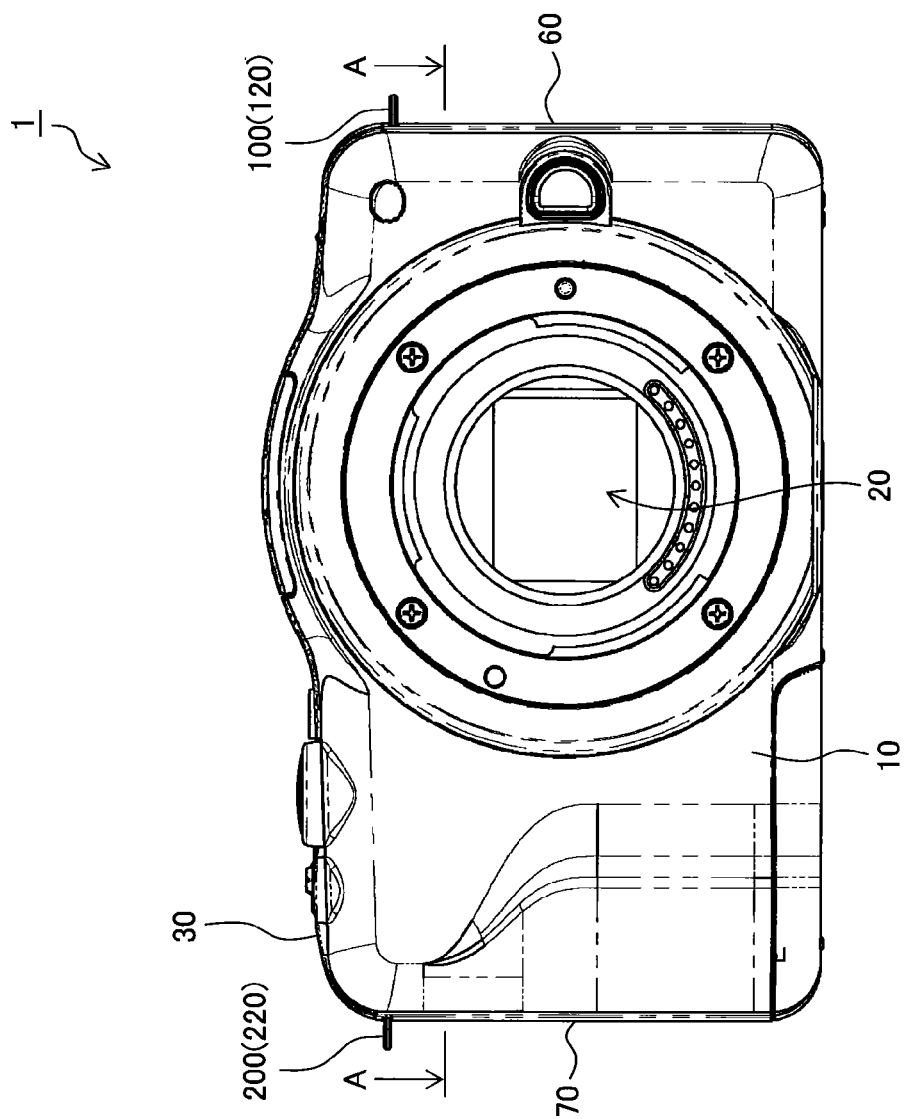
FIG. 1 is an anterior view of the digital camera body.
Figure 2:
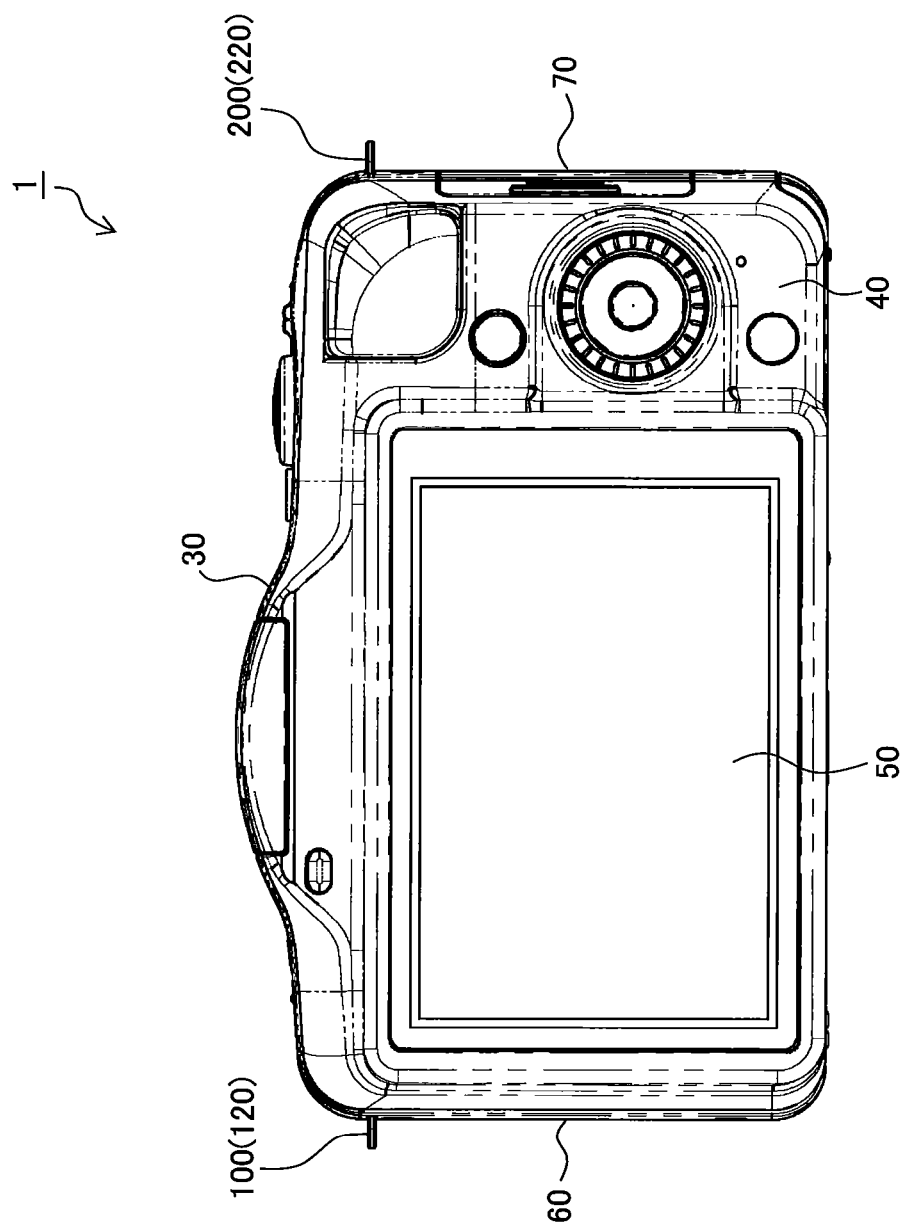
FIG. 2 is a posterior view of the digital camera body.
Figure 3:
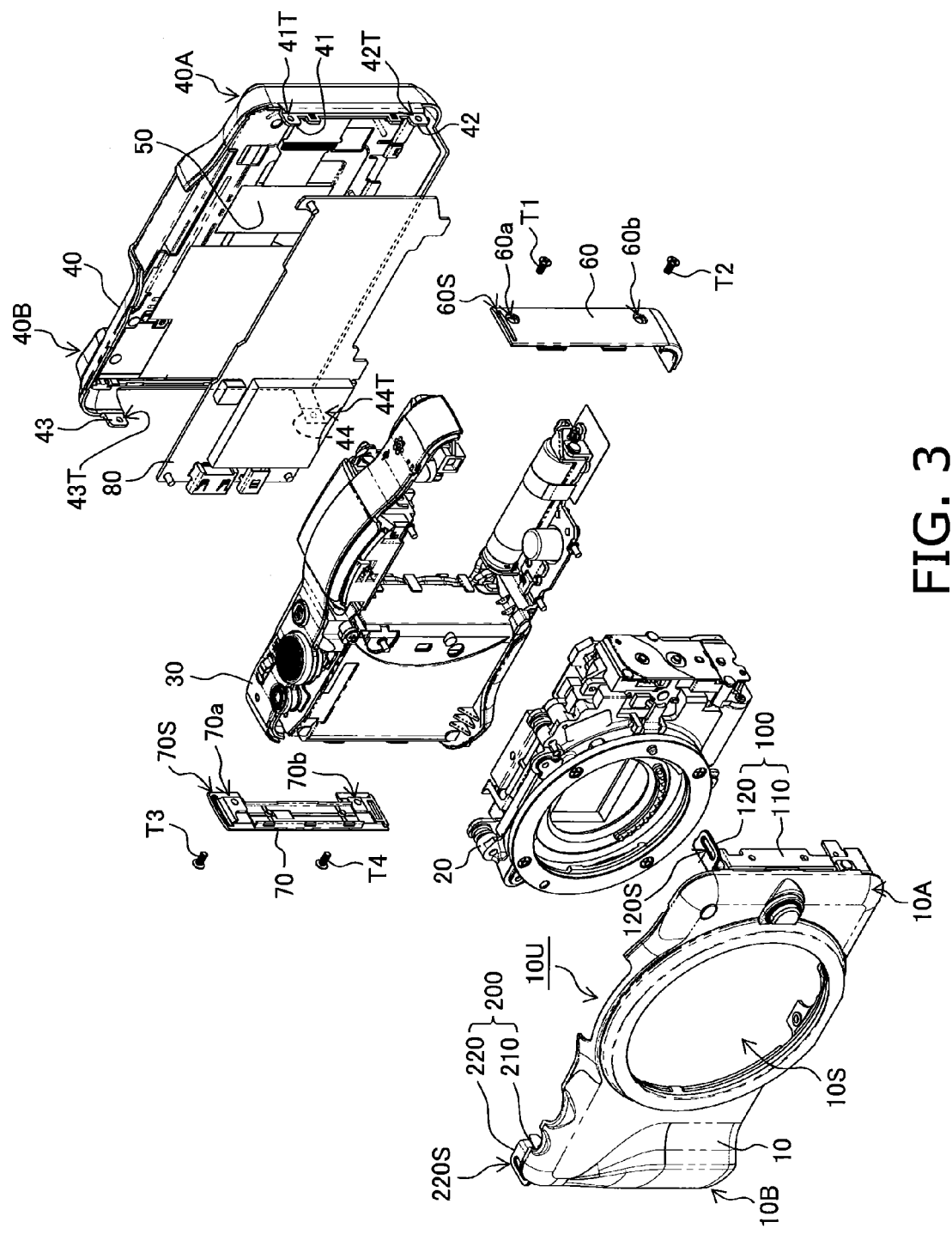
FIG. 3 is an exploded perspective view of the digital camera body.

FIG. 1 is an anterior view of a digital camera body 1 according to the embodiment. FIG. 2 is a posterior view of the digital camera body 1 according to the embodiment. FIG. 3 is an exploded perspective view of the digital camera body 1 according to the embodiment.

As shown in FIG. 1, FIG. 2, and FIG. 3, the digital camera body 1 comprises a front cover unit 10U, an imaging unit 20, a top surface/battery unit 30, a rear cover 40, a liquid crystal display unit 50, a right decorative member 60, a left decorative member 70, and a main substrate 80.

As shown in FIG. 3, the front cover unit 10U is configured from a front cover 10, a right side frame 100, and a left side frame 200.

The front cover 10 is arranged in front of the imaging unit 20. The front cover 10 has an opening part 10S to affix an interchangeable lens to the imaging unit 20. The front cover 10 is configured from aluminum.

The right side frame 100 is a long member substantially arranged in an up/down direction. The right side frame 100 has a right reinforcing part 110 and a right strap holder part 120.

The right reinforcing part 110 is a stainless steel plate member that maintains the strength of an outer frame of the digital camera body 1. The right reinforcing part 110 is arranged along a right-side end part 10A of the front cover 10 and connected to the right-side end part 10A of the front cover 10. The state of connection between the right reinforcing part 110 and the front cover 10 is described below.

The right reinforcing part 110 is arranged along a right-side end part 40A of the rear cover 40, and connected to the right-side end part 40A via a first screw T1 and a second screw T2. The right-side end part 10A of the front cover 10 is a long vertical region extending in the up/down direction of the right end of the front cover 10.

Figure 7:
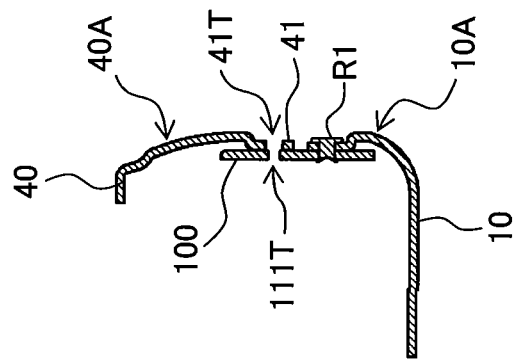
FIG. 7 is a cross-section view along A-A in FIG. 1.
Figure 7:
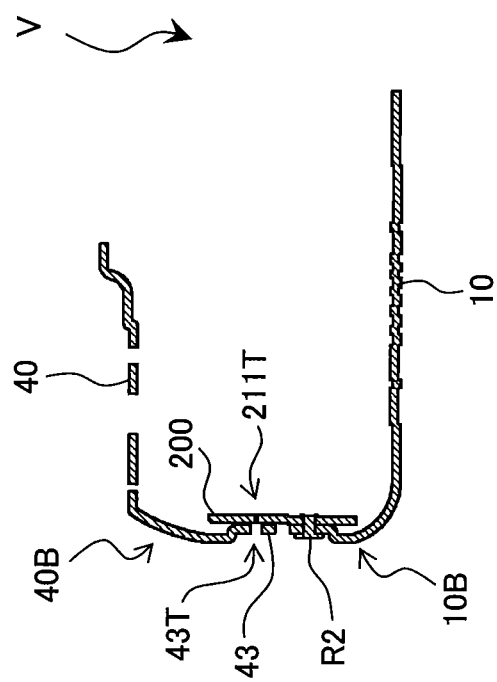

The right strap holder part 120 links to an upper end portion of the right reinforcing part 110, and protrudes from a right opening part 60S of the right decorative member 60 to the outside of the digital camera body 1 (i.e., an interior space V shown in FIG. 7). The right strap holder part 120 comprises a strap-passing aperture 120S, through which a strap passes for suspending the digital camera body 1 when the digital camera body 1 is carried.

The left side frame 200 is a long member substantially arranged along the up/down direction. The left side frame 200 has a left reinforcing part 210 and a left strap holder part 220.

The left reinforcing part 210 is a stainless steel plate member that maintains the strength of the outer frame of the digital camera body 1. The left reinforcing part 210 is arranged along a left-side end part 10B of the front cover 10 and connected to the left-side end part 10B. The state of connection between the left reinforcing part 210 and the front cover 10 is described below.

The left reinforcing part 210 is arranged along a left-side end part 40B of the rear cover 40, and connected to the left-side end part 40B via a third screw T3 and a fourth screw T4. The left-side end part 10B of the front cover 10 is a long vertical region extending in the up/down direction of the left end of the front cover 10.

The left strap holder part 220 links to an upper end portion of the left reinforcing part 210, and protrudes, from a left opening part 70S of the left decorative member 70, to the outside of the digital camera body 1 (i.e., an interior space V shown in FIG. 7). The left strap holder part 220 comprises a strap-passing aperture 220S, through which a strap passes.

The imaging unit 20 supports an interchangeable lens (not shown). The imaging unit 20 is internally equipped with an imaging element (not shown).

The top surface/battery unit 30 has a flash button, a shutter button, a battery compartment, and other elements. The imaging unit 20 is incorporated into the top surface/battery unit 30.

The rear cover 40 is arranged so as to oppose the front cover 10. The interior space V (shown in FIG. 7) is formed between the front cover unit 10U and the rear cover 40. In the present embodiment, a case structure includes the front cover unit 10U and the rear cover 40. The case structure is an outer frame for enclosing the imaging unit 20, the top surface/battery unit 30, and the main substrate 80.

As shown in FIG. 3, the rear cover 40 has a first fastening part 41 and a second fastening part 42 formed on the right-side end part 40A. A first fastening aperture 41T into which the first screw T1 is threaded is formed on the first fastening part 41; and a second fastening aperture 42T into which the second screw T2 is threaded is formed in the second fastening part 42. The rear cover 40 has a third fastening part 43 and a fourth fastening part 44 formed on the left-side end part 40B. A third fastening aperture 43T into which the third screw T3 is threaded is formed in the third fastening part 43, and a fourth fastening aperture 44T into which the fourth screw T4 is threaded is formed in the fourth fastening part 44. The right-side end part 40A of the rear cover 40 extends along a long vertical region in the up/down direction on the right end of the rear cover 40. The left-side end part 40B is a long vertical region extending in the up/down direction on the left end of the rear cover 40.

A monitor, such as a liquid crystal display unit 50, is fitted into the rear cover 40.

The right decorative member 60 has a first through-hole 60a, a second through-hole 60b, and a right opening part 60S. The first and second screws T1 and T2 are passed through the first and second through-holes 60a and 60b of the right decorative member 60, and threaded into the first and second fastening apertures 41T, 42T of the rear cover. The right opening part 60S is, as shown in FIG. 1 and FIG. 2, an opening for allowing only the right strap holder part 120 of the right side frame 100 to emerge out from the right side of the digital camera body 1.

The left decorative member 70 has a third through-hole 70a, a fourth through-hole 70b, and a left opening part 70S. The third and fourth screws T3, T4 are passed through the third and fourth through-holes 70a, 70b of the left decorative member 70, and threaded into the third and fourth fastening apertures 43T, 44T of the rear cover 40 The left opening part 70S is, as shown in FIG. 1 and FIG. 2, an opening allowing the left strap holder part 220 of the left side frame 200 to emerge out from the left of the digital camera body 1.

The main substrate 80 is arranged between the top surface/battery unit 30 and the rear cover 40. The main substrate 80 supports a CPU for performing principal electrical processes in the digital camera.

2. Configuration of the Right Side Frame 100

Figure 4A:
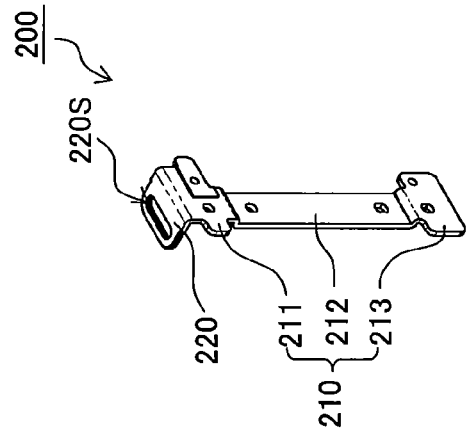
FIG. 4 shows the configuration of the right side frame.
Figure 4B:
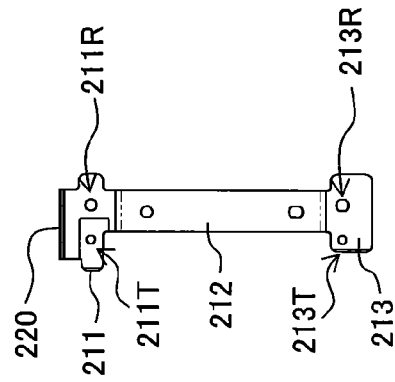

FIG. 4(a) is a perspective view showing the configuration of the right side frame 100 according to the embodiment. FIG. 4(b) is a side view showing the configuration of the right side frame 100 according to the embodiment.

As shown in FIG. 4(a), the right reinforcing part 110 comprises an upper connecting part 111, a communicating part 112, a lower connecting part 113, and a reinforcing part 114.

The upper connecting part 111 connects an upper side of the right-side end part 10A of the front cover 10 with an upper side of the right-side end part 40A of the rear cover 40. As shown in FIG. 4(b), the upper connecting part 111 has formed therein a first fastening aperture 111T into which the first screw T1 is threaded, and a first through-aperture 111R through which a first rivet R1 (see FIG. 6) is passed. The upper connecting part 111 is formed wide enough to connect the front cover 10 and the rear cover 40.

The communicating part 112 communicates with the upper connecting part 111 and the lower connecting part 113. The communicating part 112 is formed to a long plate shape extending along the up/down direction. The communicating part 112 is sandwiched between the front cover 10 and the rear cover 40 in order to reinforce the front cover 10 and the rear cover 40. The communicating part 112 is formed narrower than the upper connecting part 111 and the lower connecting part 113 in order to reduce the thickness of the main body.

The lower connecting part 113 connects a lower side of the right-side end part 10A of the front cover 10 and a lower side of the right-side end part 40A of the rear cover 40. As shown in FIG. 4(b), the lower connecting part 113 has formed therein a second fastening aperture 113T into which the second screw T2 is threaded, and a second through-aperture 113R through which a second rivet R2 is passed (see FIG. 6). The lower connecting part 113 is formed wide enough to connect the front cover 10 and the rear cover 40.

The reinforcing part 114 is connected to a lower end of the lower connecting part 113. The reinforcing part 114 is bent to an L-shape in order to reinforce a corner between a right side surface and a bottom surface of the digital camera body 1. The reinforcing part 114 covers the lower right corner of the imaging unit 20.

The right strap holder part 120 links to an upper end of the upper connecting part 111. The right strap holder part 120 is folded at a right angle relative to the upper connecting part 111, and protrudes from the digital camera body 1. The right strap holder part 120 is wide enough for the strap-passing aperture 120S to be formed therein.

3. Configuration of the Left Side Frame 200

Figure 5A:
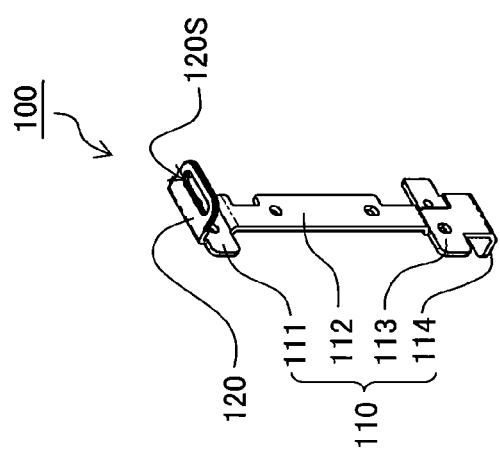
FIG. 5 shows the configuration of the left side frame.
Figure 5B:
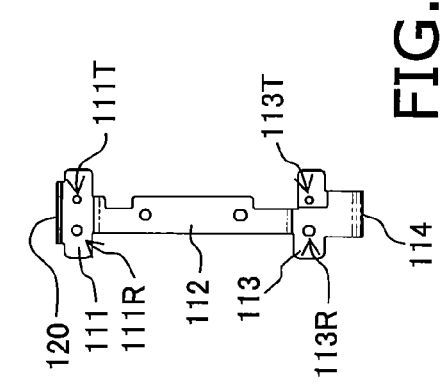

FIG. 5(*a*) is a perspective view showing the configuration of the left side frame 200 according to the embodiment. FIG. 5(*b*) is a side view showing the configuration of the left side frame 200 according to the embodiment.

As shown in FIG. 5(*a*), the left reinforcing part 210 comprises an upper connecting part 211, a communicating part 212, and a lower connecting part 213.

The upper connecting part 211 connects an upper side of the left-side end part 10B of the front cover 10 and an upper side of the left-side end part 40B of the rear cover 40. As shown in FIG. 5(*b*), the upper connecting part 211 has formed therein a third fastening aperture 211T into which the third screw T3 is threaded, and a third through-aperture 211R through which a third rivet R3 described further below (see FIG. 6) is passed. The upper connecting part 211 is formed wide enough to connect the front cover 10 and the rear cover 40.

The communicating part 212 communicates with the upper connecting part 211 and the lower connecting part 213. The communicating part 212 is formed to a long plate shape extending along the up/down direction. The communicating part 212 is sandwiched between the front cover 10 and the rear cover 40 in order to reinforce the front cover 10 and the rear cover 40. The communicating part 212 is formed narrower than the upper connecting part 211 and the lower connecting part 213 in order to reduce the thickness of the main body.

The lower connecting part 213 connects a lower side of the left-side end part 10B of the front cover 10 and a lower side of the left-side end part 40B of the rear cover 40. As shown in FIG. 5(*b*), the lower connecting part 213 has formed therein a fourth fastening aperture 214T into which the fourth screw T4 is threaded, and a fourth through-aperture 213R through which a fourth rivet R4 described further below (see FIG. 6) is passed. The lower connecting part 213 is formed wide enough to connect the front cover 10 and the rear cover 40.

The left strap holder part 220 links to an upper end of the upper connecting part 211. The left strap holder part 220 is folded at a right angle relative to the upper connecting part 211, and is formed so as to protrude towards the outside of the digital camera body 1.

The left strap holder part 220 is wide enough for the strap-passing aperture 220S to be formed therein.

4. Configuration of the Front Cover Unit 10U

Figure 6:
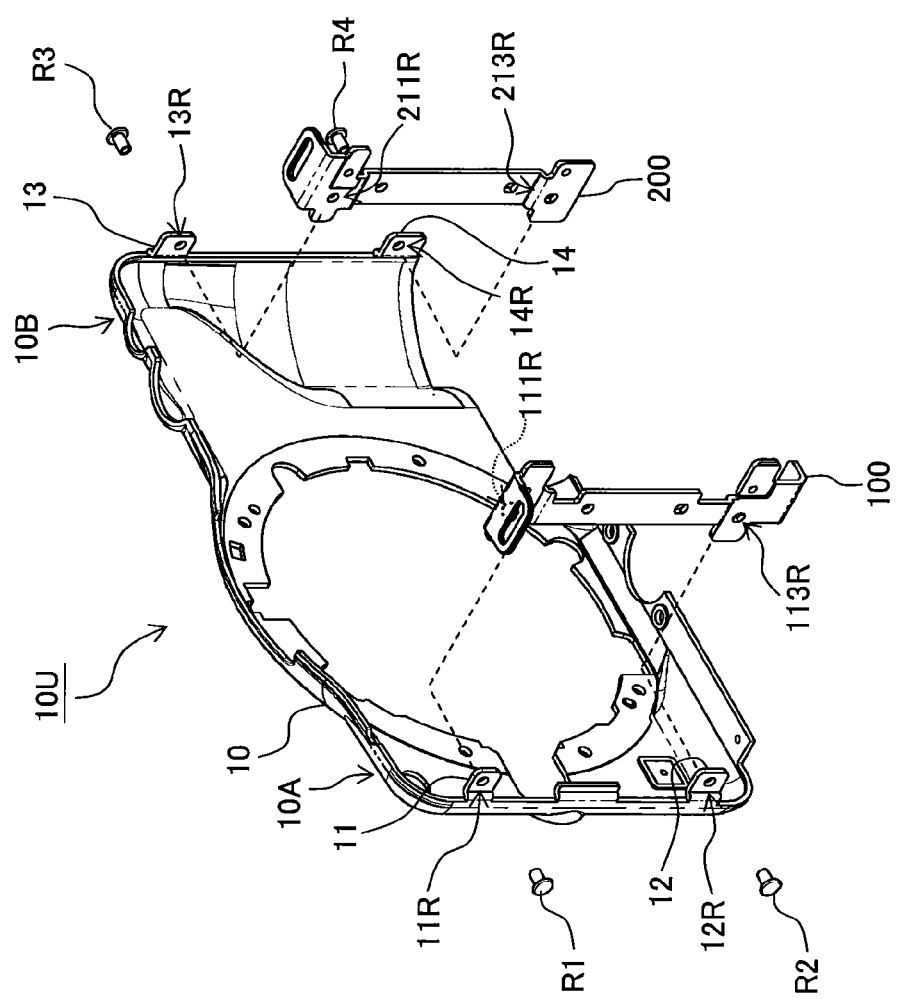
FIG. 6 is an exploded perspective view of the front cover unit.

FIG. 6 is an exploded perspective view of the front cover unit 10U according to the embodiment.

As shown in FIG. 6, the front cover 10 has a first through-part 11 and a second through-part 12 formed on the right-side end part 10A. A first through-aperture 11R through which the first rivet R1 is passed is formed in the first through-part 11, and a second through-aperture 12R through which the second rivet R2 is passed is formed in the second through-part 12. The front cover 10 also has a third through-part 13 and a fourth through-part 14 formed on the left-side end part 10B. A third through-aperture 13R through which the third rivet R3 is passed is formed in the third through-part 13, and a fourth through-aperture 14R through which the fourth rivet R4 is passed is formed in the fourth through-part 14.

The first rivet R1 is passed through the first through-aperture 11R formed in the first through-part 11 of the front cover 10 and the first through-aperture 111R formed in the upper connecting part 111 of the right side frame 100, and is secured by swaging. Similarly, the second rivet R2 is passed through the second through-aperture 12R formed in the second through-part 12 of the front cover 10 and the second through-aperture 113R formed in the lower connecting part 113 of the right side frame 100, and secured by swaging. The front cover 10 and the right side frame 100 are thereby connected to each other.

The third rivet R3 is passed through the third through-aperture 13R formed in the third through-part 13 of the front cover 10 and the third through-aperture 211R formed in the upper connecting part 211 of the left side frame 200, and secured by swaging. Similarly, the fourth rivet R4 is passed through the fourth through-aperture 14R formed in the fourth through-part 14 of the front cover 10 and the fourth through-aperture 213R formed in the lower connecting part 213 of the left side frame 200, and secured by swaging. The front cover 10 and the left side frame 200 are thereby connected to each other.

In the present embodiment, the diameter of each of the first through fourth through-apertures 11R, 12R, 13R, and 14R of the front cover 10; the diameter of each of the first and second through-apertures 111R and 113R of the right side frame 100; and the diameter of each of the third and fourth through-apertures 211R and 213R of the left side frame 200 match the external diameter of the first through fourth rivets R1, R2, R3, and R4. Any positional displacement is thereby inhibited and a firm fastening is obtained between the front cover 10 and the right side frame 100, and between the front cover 10 and the left side frame 200.

FIG. 7 is a cross-section view along A-A in FIG. 1.

As shown in FIG. 7, the right side frame 100 and the left side frame 200 are arranged on the inside of the front cover 10. The first rivet R1 and the second rivet R2 are inserted from the outside of the front cover 10, and an inside end of each of the first rivet R1 and the second rivet R2 is secured by swaging. Each of the first rivet R1 and the second rivet R2 is thereby inhibited from protruding into the interior space V, thereby maximizing the capacity of the interior space V.

The rear cover 40 is arranged on the outside of the right side frame 100 and the left side frame 200. The first screw T1 is threaded, from the outside, into the first fastening aperture 111T formed in the upper connecting part 111 of the right side frame 100 and the first fastening aperture 41T formed in the first fastening part 41 of the rear cover 40. Similarly, the third screw T3 is threaded, from the outside, into the third fastening aperture 211T formed in the upper connecting part 211 of the left side frame 200 and the third fastening aperture 43T formed in the third fastening part 43 of the rear cover 40.

In FIG. 7, the front cover 10 and the side frames are secured using rivets. However, the rear cover 40 and the side frames may be secured using rivets, thereby making it possible to utilize the rear-side space in the interior space V in an effective manner.

Additional Features (1) In the digital camera body 1 according to the exemplary embodiment, the right side frame 100 (an example of a first side frame) has the right reinforcing part 110 (an example of a reinforcing part) and the right strap holder part 120 (an example of a strap holder part). The right reinforcing part 110 is arranged along, and connected to, each of the right-side end part 10A (an example of a first side end part) of the front cover 10 (an example of a first cover) and the right-side end part 40A (an example of a second side end part) of the rear cover 40 (an example of a second cover). The right strap holder part 120 links to the upper end part of the right reinforcing part 110, and is folded outwardly with respect to the interior space V.

Because the right strap holder part 120 is formed so as to be integral with the right reinforcing part 110, that constitutes the outer frame of the digital camera body 1, it is possible to reduce the width of the right strap holder part 120. It is also possible to prevent the right strap holder part 120 from entering the interior space V of the digital camera body 1, and there is no need to provide, to the outside of the digital camera body 1, a structure for supporting the right strap holder part 120. It is therefore possible to both expand the interior space V and narrow the width of the digital camera body 1.

This effect can also be similarly obtained by the left side frame 200 having the left reinforcing part 210 (an example of a reinforcing part) and the left strap holder part 220 (an example of a strap holder part).

(2) The digital camera body 1 according to the exemplary embodiment comprises the first rivet R1 and the second rivet R2 (an example of a rivet) passed through the right-side end part 10A of the front cover 10 and the right reinforcing part 110 of the right side frame 100, and secured by swaging.

Since the front cover 10 and the right side frame 100 are thus secured by swaging to each other by the first rivet R1 and the second rivet R2, it is possible to inhibit any positional displacement between the front cover 10 and the right side frame 100.

This effect can be similarly obtained by the third rivet R3 and the fourth rivet R4 (an example of a rivet) passed through the left-side end part 10B of the front cover 10 and the left reinforcing part 210 of the left side frame 200, and secured by swaging.

(3) The digital camera body 1 according to the exemplary embodiment comprises the left side frame 200 arranged between the front cover 10 and the rear cover 40, the left side frame 200 opposing the right side frame 100.

The outer frame of the digital camera body 1 is configured by connecting the front cover 10 and the rear cover 40 using the right side frame 100 and the left side frame 200. There is no need to separately provide a frame in the interior space V, making it possible to further diminish the size of the digital camera body 1.

(4) In the digital camera body 1 according to the exemplary embodiment, the front cover 10 and the rear cover 40 are made of aluminum (an example of a metal). By using such a material, it is possible to obtain an outer frame of adequate strength without separately providing a frame in the interior space V.

Alternative Embodiments

Although the present invention has been described using the exemplary embodiment, the discussion and drawings forming a part of this disclosure shall not be understood to limit the invention. A variety of alternative embodiments, examples, and operational techniques shall be apparent, from this disclosure, to a person skilled in the art.

(A) In the exemplary embodiment, the digital camera body 1 comprises a right side frame 100 and a left side frame 200; however, this is not provided by way of limitation. The digital camera body 1 may comprise only one of the right side frame 100 and the left side frame 200.

(B) In the exemplary, the front cover 10 and the right side frame 100 are secured by swaging by the first rivet R1 and the second rivet R2; however, this is not provided by way of limitation. The front cover 10 and the right side frame 100 may be secured by a screw or a similar element. Similarly, the front cover 10 and the left side frame 200 may be secured by a screw or a similar element.

(C) In the exemplary embodiment, the right side frame 100 is secured by swaging to the front cover 10; however, this is not provided by way of limitation. The right side frame 100 may be secured by swaging to the rear cover 40. Similarly, the left side frame 200 may be secured by swaging to the rear cover 40 instead of the front cover 10.

(D) In the exemplary embodiment, a description was given using a digital camera as an example of an imaging device. A video camera is an example of other formats of the imaging device.

(E) In the exemplary embodiment, a description was given for an instance in which a case structure in which the width of a strap holder can be narrowed is applied to an imaging device. However, a case structure of such description can be applied not only to an imaging device but also to a portable telephone, an IC recorder, and a variety of other electronic instruments.

It is apparent that the present invention includes a variety of embodiments that are not described in the present specification. The technical scope of the present disclosure is defined solely by matters specifying the invention according to the claims as deemed appropriate in regard to the above description.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the present invention should be interpreted relative to a case structure or imaging device.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment.

It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A case structure comprising:
a first cover;
a second cover opposing the first cover, an internal space being formed between the first cover and the second cover; and
a first side frame arranged between the first cover and the second cover;
the first side frame including a first reinforcing part and a first strap holder part, the first reinforcing part arranged along each of a first side end part of the first cover and a second side end part of the second cover, the first reinforcing part being connected to each of the first side end part and the second side end part; and the first strap holder part connected to an end part of the first reinforcing part, the first strap holder part being folded in an outward direction from the internal space.

2. The case structure according to claim 1, further comprising:
a rivet passed through the first side end part and the first reinforcing part, and secured by swaging.

3. The case structure according to claim 1, further comprising:
a second side frame arranged between the first cover and the second cover, the second side frame opposing the first side frame.

4. The case structure according to claim 3, wherein the first cover and the second cover are made of metal.

5. An imaging device comprising:
the case structure according to claim 1; and
an imaging element configured to convert light into an electric signal, the imaging element being arranged in the internal space.

6. The case structure according to claim 3, wherein:
the second side frame includes a second reinforcing part and a second strap holder part, the second reinforcing part arranged along each of a third side end part of the first cover and a fourth side end part of the second cover, the reinforcing part being connected to each of the third side end part and the fourth side end part; and the second strap holder part connected to an end part of the second reinforcing part, the second strap holder part folded in an outward direction from the internal space.

7. The case structure according to claim 3, further comprising:
a first decorative member, secured to an opposite surface of the first side frame from the interior space and substantially covering an outward surface of the first side frame respective to the internal space, configured to allow the first strap holder part to pass; and
a second decorative member, secured to an opposite surface of the second side frame from the interior space and substantially covering an outward surface of the second side frame respective to the internal space, configured to allow a second strap holder part to pass.

* * * * *